United States Patent
Athalye

(10) Patent No.: US 7,398,769 B2
(45) Date of Patent: Jul. 15, 2008

(54) ELECTROSTATIC DISCHARGE SOLUTION FOR GROUNDING STRUTS AND SPRING IN FUEL SUPPLY UNIT

(75) Inventor: Parag Athalye, Auburn Hills, MI (US)

(73) Assignee: Continental Automotive Systems US, Inc., Auburn Hills ( * ) Notice: Subject to any disclaimer, the term of this patent is extended or adjusted under 35 U.S.C. 154(b) by 0 days.

(21) Appl. No.: 11/802,046

(22) Filed: May 18, 2007

(65) Prior Publication Data

US 2007/0283936 A1 Dec. 13, 2007

Related U.S. Application Data

(60) Provisional application No. 60/802,567, filed on May 22, 2006.

(51) Int. Cl.
*F02M 37/04* (2006.01)
(52) U.S. Cl. ..................................................... 123/509
(58) Field of Classification Search ................... 123/509
See application file for complete search history.

(56) References Cited

U.S. PATENT DOCUMENTS

| | | | | |
|---|---|---|---|---|
| 4,945,884 A | * | 8/1990 | Coha et al. .................. 123/509 |
| 5,080,077 A | * | 1/1992 | Sawert et al. ................ 123/514 |
| 5,482,444 A | * | 1/1996 | Coha et al. ................... 417/363 |
| 5,762,049 A | * | 6/1998 | Jones et al. .................. 123/514 |
| 6,168,713 B1 | * | 1/2001 | Sekine et al. ............. 210/172.3 |
| 6,216,671 B1 | * | 4/2001 | Sawert et al. ................ 123/509 |
| 6,886,541 B2 | * | 5/2005 | Powell ........................ 123/509 |
| 6,928,989 B2 | * | 8/2005 | Powell ........................ 123/509 |
| 7,140,247 B2 | * | 11/2006 | Forgue et al. .................. 73/313 |
| RE39,599 E | * | 5/2007 | Kanamaru ................... 123/509 |

* cited by examiner

*Primary Examiner*—Thomas N Moulis

(57) ABSTRACT

A fuel supply unit (40) for vehicles includes a flange assembly (28) and a reservoir assembly (38). The flange assembly includes a flange (36), at least a pair of metal struts (26) extending from the flange, and electrically conductive spring structure (20). The spring structure includes a first and second spring members (24, 26) having coils. Each coil receives at least a portion of an associated strut. A central leg member (30) joins the first and second spring members. The reservoir assembly includes a reservoir (42), a fuel pump (44) in the reservoir, a fuel filter (46) in the reservoir and associated with the fuel pump for filtering fuel. The fuel filter has an electrically conductive portion (48). The struts are coupled with the reservoir with the spring members being disposed between the flange and the reservoir. The central leg member contacts the electrically conductive portion of the fuel filter.

20 Claims, 4 Drawing Sheets

ELECTROSTATIC DISCHARGE SOLUTION FOR GROUNDING STRUTS AND SPRING IN FUEL SUPPLY UNIT

This application claims the benefit of the earlier filing date of U.S. Provisional Application No. 60/802,567, filed on May 22, 2006, and claims the benefit thereof for priority purposes.

FIELD OF THE INVENTION

The invention relates to fuel supply units for automobile vehicles and, more particularly, to providing a grounding path in the unit for electrostatic dissipation.

BACKGROUND OF THE INVENTION

With reference to FIG. 6, a typical fuel supply unit for a vehicle includes a steel or plastic flange 10 configured to be sealed to a wall of a fuel tank. The flange is interconnected with a fuel pump assembly 12 by a pair of metal struts 14. The flange 10 also provides various pathways into and out of the tank for fuel and electrical wiring.

Recently, there has been a greater focus on Electro Static Dissipation (ESD) in such fuel supply systems. It is known that as fuel flows through various components of the fuel supply system, such as the fuel pump assembly, the fuel filter, and various valving and tubing, there is the potential for static electricity to be generated in the various conductive components of the fuel supply system. To dissipate this static electricity, fuel supply systems electrically ground the components through electrical interconnection.

For example, as shown in FIG. 6, some systems employ a separate cable harness 16 which grounds through the pump negative. Other systems employ grounding clips (not shown) that touch the inline filter.

Accordingly, there is a need provide for ESD without the need to use additional components such as a separate harness or clips to achieve grounding.

SUMMARY OF THE INVENTION

An object of the invention is to fulfill the need referred to above. In accordance with the principles of the present invention, this objective is obtained by providing a fuel supply unit for a vehicle including a flange assembly and a reservoir assembly. The flange assembly includes a flange, at least a pair of metal struts extending from the flange, and electrically conductive spring structure. The spring structure includes a first spring member having coils and a second spring member having coils. The coils of the first and second spring members receive at least a portion of an associated strut. A central leg member joins the first and second springs members so as to be in spaced relation. The reservoir assembly includes a reservoir, a fuel pump in the reservoir, a fuel filter in the reservoir and associated with the fuel pump for filtering fuel. The fuel filter has an electrically conductive portion. The struts are coupled with the reservoir with the spring members being disposed between the flange and the reservoir. The central leg member contacts the electrically conductive portion of the fuel filter.

In accordance with another aspect of the disclosed embodiment, a spring structure provides a grounding path in a fuel supply unit. The fuel supply unit has metal struts. The spring structure includes a first spring member having coils and a second spring member having coils. The coils of the first and second spring members are constructed and arranged to receive at least a portion of an associated strut of the fuel supply unit. A central leg member joins the first and second springs members so as to be in spaced relation. At least a portion of the central leg member is disposed at an angle with respect to an axis of at least one of the coils so as to be in a position to contact a metal member of the fuel delivery unit and thereby electrically ground the spring structure and struts.

In accordance with yet another aspect of the disclosed embodiment, a method of electrostatic dissipation in a fuel supply unit is provided. The unit includes a flange assembly including a flange, at least a pair of metal struts extending from the flange, and a reservoir assembly comprising a reservoir. A fuel pump is disposed in the reservoir. A fuel filter is disposed in the reservoir for filtering fuel prior to exiting the fuel pump. The fuel filter is in grounding contact with the fuel pump and the fuel filter has an electrically conductive portion. The electrically conductive spring structure is associated with each strut of the pair of struts. The spring structure has a contact member. The method ensures that the contact member contacts the electrically conductive portion of the fuel filter to provide a grounding path through the fuel pump via the fuel filter.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 2:
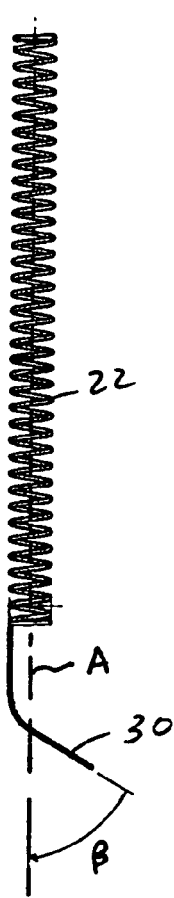
FIG. 2 is a side view of the spring structure of FIG. 1.
Figure 1:
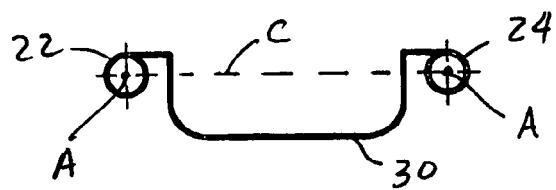
FIG. 1 is a plan view of a spring structure for a fuel supply unit provided in accordance with an embodiment of the present invention.

With reference to FIGS. 1 and 2, a spring structure for a fuel supply unit is shown, generally indicated at 20, in accordance with an embodiment of the invention. FIG. 1 is a plan view and FIG. 2 is a side view of the spring structure. As shown, the spring structure includes a first elongated coil spring member 22 and a second elongated coil spring member 24, each constructed and arranged to be received by an associated metal strut 26 of a flange assembly, generally indicated at 28 in FIG. 3. The spring members 22 and 24 are joined, in spaced relation, via a central leg member 30. In the embodiment, the central leg member 30 is of generally U-shape and extends downwardly from ends 32 and 34 of a respective spring member 22 and 24. As shown in FIG. 1, the centers of the spring members 22 and 24 are disposed generally on a common axis C. The spring structure 20 is made from a single piece of electrically conductive material such as music wire.

As shown in FIG. 2, a portion of the central leg member 30 is disposed at an angle β with respect to an axis A of the spring members 22 and 24. In the embodiment, β is approximately 60 degrees, the function of which will be explained below. Axis A is transverse with respect to the common axis C.

Figure 3:
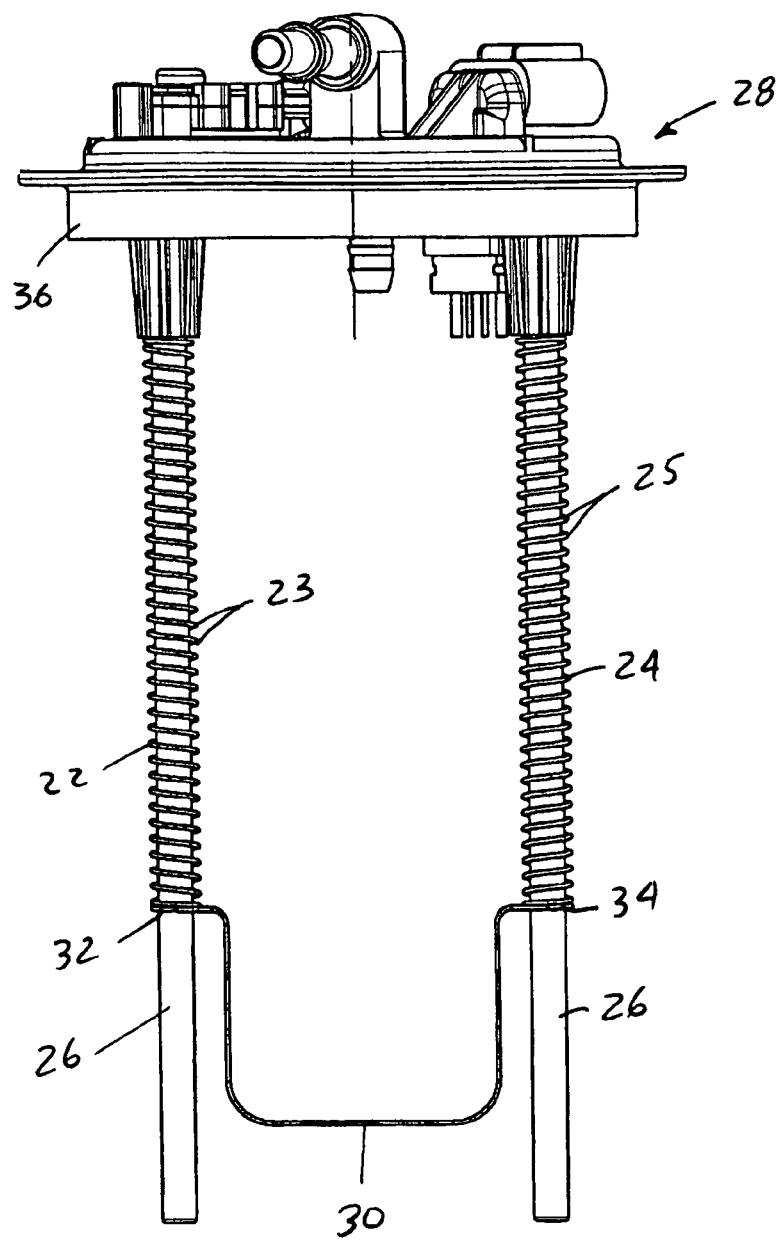
FIG. 3 is a front view of a flange assembly of a fuel supply unit including the spring structure of FIG. 2 coupled with struts.

With reference to FIG. 3, in the flange assembly 28, the coils 23 and 25 of the spring members 22 and 24 receive an associated strut 26 with the central member 30 there-between. The flange assembly 28 is conventional and includes a flange 36 configured to be sealed to a wall of a fuel tank (not shown). The flange 36 provides various pathways into and out of the tank for fuel and electrical wiring.

Figure 4:
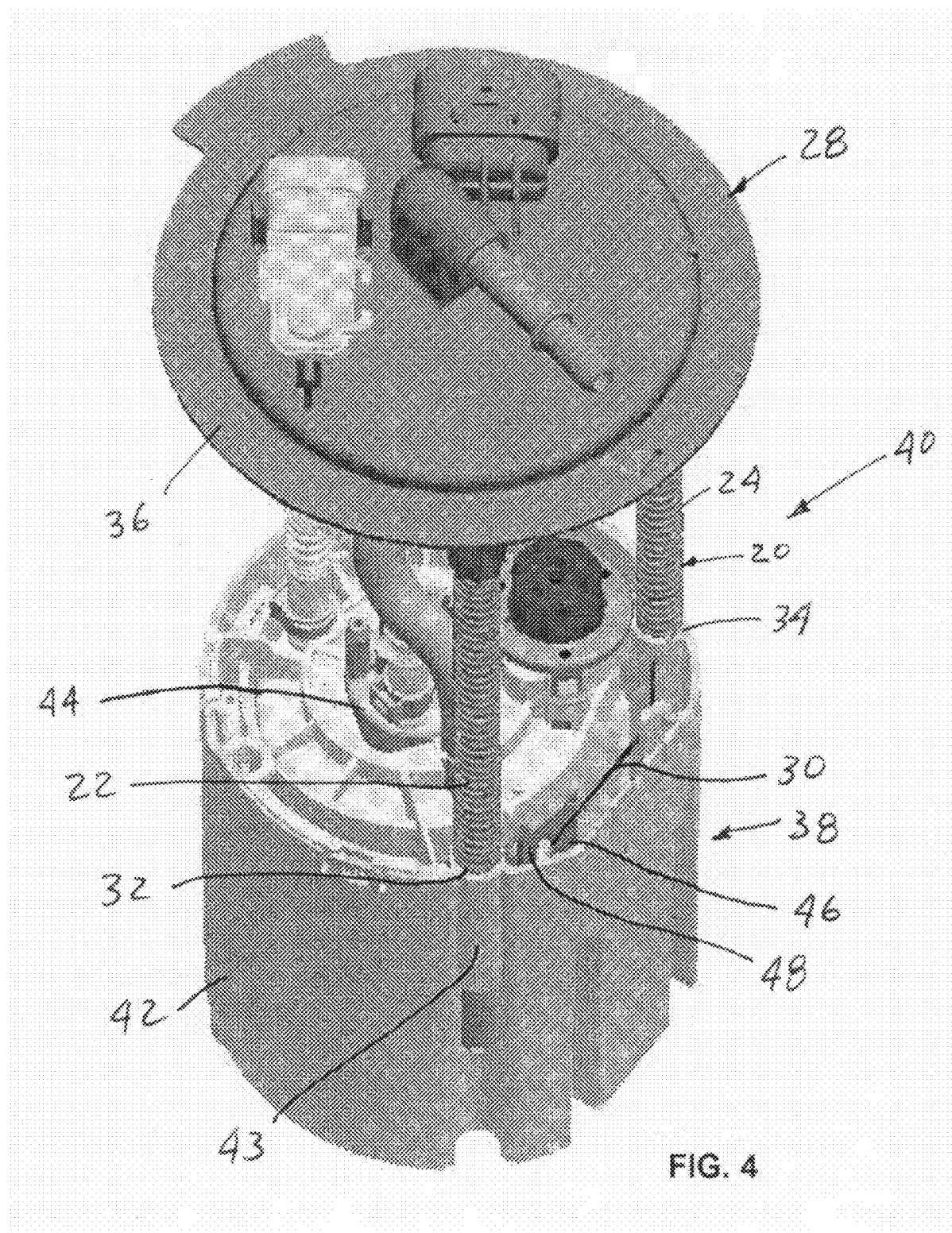
FIG. 4 is a view of a fuel supply unit including the flange assembly of FIG. 3.

With reference to FIG. 4, the flange assembly 28 is shown connected with a reservoir assembly, generally indicated at 38, to define a fuel supply unit 40. The reservoir assembly 38 is conventional and includes a reservoir 42 containing therein a fuel pump 44 and an inline fuel filter 46 for filtering fuel prior to exiting the fuel pump 44. The struts 26 are received by bosses 43 in the reservoir and the ends 32 and 34 of the spring members 22 and 24 rest on a surface of the bosses 43 to provide some resiliency between the flange 36 and the reservoir 42.

Figure 5:
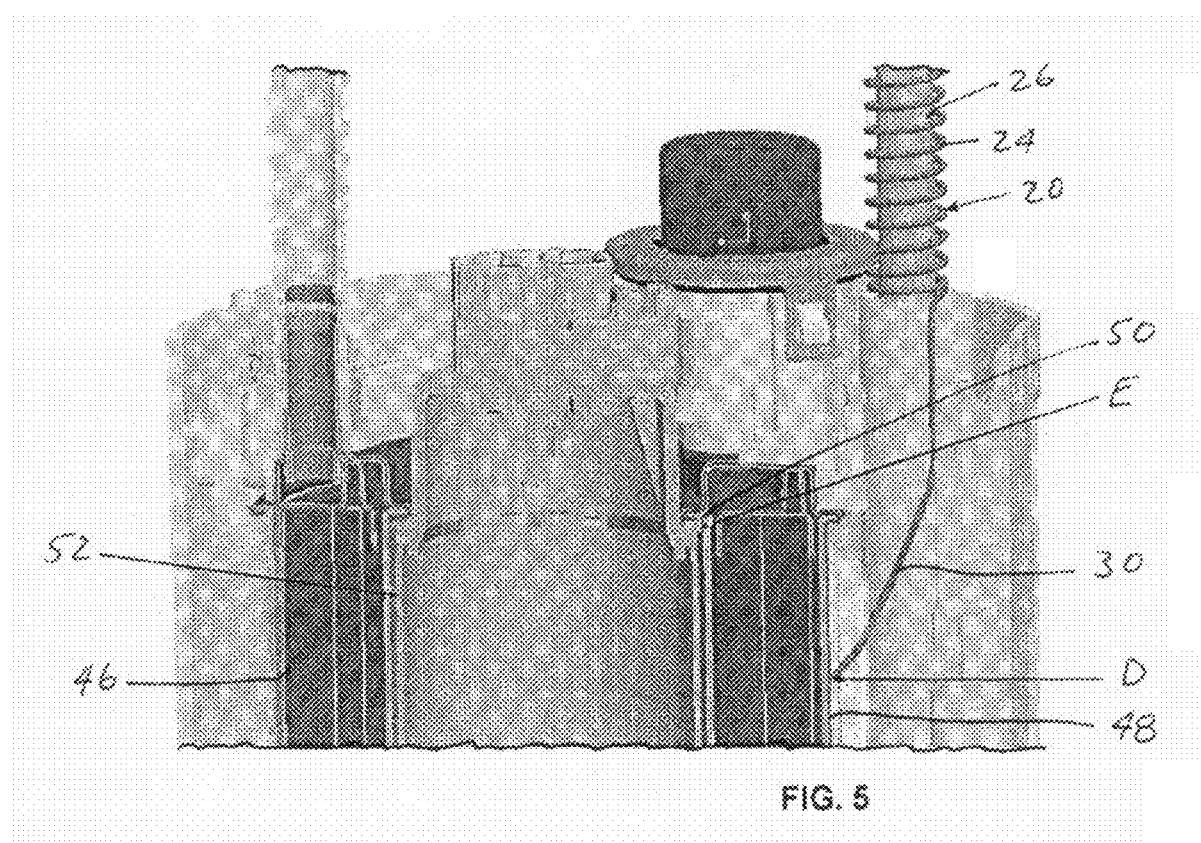
FIG. 5 is a partial sectional view of the reservoir assembly of the fuel supply unit of FIG. 4, showing a grounding path.
Figure 6:
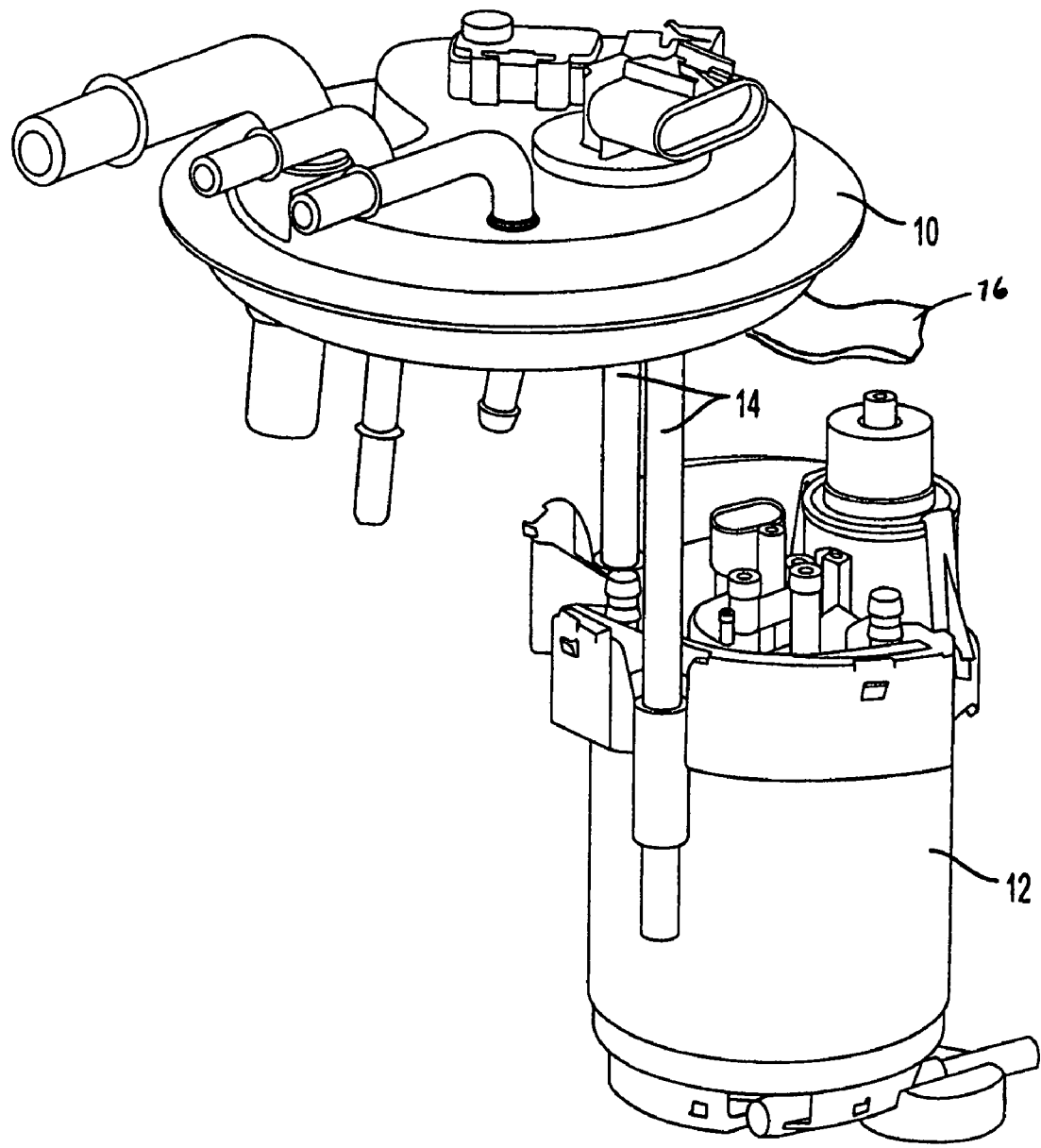
FIG. 6 is perspective view of a conventional fuel supply unit for a vehicle using a separate cable harness for ESD.

With reference to FIG. 5, electrical grounding occurs since the metal strut 25 and spring structure 20 contacts, at D, the metal housing 48 of the inline fuel filter 26. The inside rim of the metal housing 48 is in contact, at E, with a metal wave washer 50. The wave washer 50 is connected to the metal pump housing 52 and the housing 52 is attached to the pump negative terminal (not shown) for grounding ESD. The wave washer 50 can be considered to be part of either the fuel pump housing 52 or the fuel filter housing 48.

Thus, by employing the spring structure 20, there is no need for separate harness or grounding clips as in conventional fuel supply units, thereby reducing the number of components and reducing cost. Due to the angle β, a constant contact force is achieved between the central leg member 30 and the filter housing 48. It can be appreciated that the central leg member 30 can contact any portion of the fuel filter 46 that is electrically conductive, e.g., the housing, a connector, a tube, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A spring structure for providing a grounding path in a fuel supply unit, the fuel supply unit having metal struts, the spring structure comprising:
   a first spring member having coils,
   a second spring member having coils, the coils of the first and second spring members being constructed and arranged to receive at least a portion of an associated strut of the fuel supply unit, and
   a central leg member joining the first and second springs members so as to be in spaced relation, at least a portion of the central leg member being disposed at an angle with respect to an axis of at least one of the coils so as to be in a position to contact a metal member of the fuel delivery unit and thereby electrically ground the spring structure and struts.

2. The structure of claim 1, wherein each of the first and second spring members has an end, the central leg member joining the ends of the first and second spring members.

3. The structure of claim 2, wherein the central leg member is of generally U-shape.

4. The structure of claim 1, wherein centers of the coils of the first and second spring members are disposed generally on a common axis.

5. The structure of claim 4, wherein the axis of the at least one coil is transverse with respect to the common axis.

6. The structure of claim 1, wherein the angle is about 60 degrees.

7. The structure of claim 1, wherein the spring structure is composed of a single piece of music wire.

8. A fuel supply unit for a vehicle comprising:
   a flange assembly comprising:
      a flange,
      at least a pair of metal struts extending from the flange, and
      electrically conductive spring structure including a first spring member having coils; a second spring member having coils, the coils of the first and second spring members receiving at least a portion of an associated strut; and a central leg member joining the first and second springs members so as to be in spaced relation,
   a reservoir assembly comprising:
      a reservoir,
      a fuel pump in the reservoir,
      a fuel filter in the reservoir and associated with the fuel pump for filtering fuel, the fuel filter having an electrically conductive portion,
   wherein the struts are coupled with the reservoir with the spring members being disposed between the flange and the reservoir, and wherein the central leg member contacts the electrically conductive portion of the fuel filter.

9. The unit of claim 8, wherein the electrically conductive portion of the fuel filter is a metal housing, the central leg member contacts at least a portion of the metal housing.

10. The unit of claim 9, wherein the metal housing is in contact with a metal housing of the fuel pump for grounding through the fuel pump.

11. The unit of claim 8, wherein each of the first and second spring members has an end, the central leg member joining the ends of the first and second spring members.

12. The unit of claim 8, wherein the central leg member is of generally U-shape.

13. The unit of claim 8, wherein centers of the first and second spring members are disposed generally on a common axis.

14. The unit of claim 13, wherein a portion of the central member is disposed at an angle with respect to an axis of at least one of the spring members so as to force contact with the electrically conductive portion of the fuel filter, the axis being transverse with respect to the common axis.

15. The unit of claim 14, wherein the angle is about 60 degrees.

16. The unit of claim 8, wherein the spring structure is composed of a single piece of music wire.

17. A method of electrostatic dissipation in a fuel supply unit, the unit including a flange assembly including a flange, at least a pair of metal struts extending from the flange, and a reservoir assembly comprising a reservoir, a fuel pump in the reservoir, a fuel filter in the reservoir for filtering fuel prior to exiting the fuel pump, the fuel filter being in grounding contact with the fuel pump and the fuel filter having an electrically conductive portion, the method comprising:

associating electrically conductive spring structure with each strut of the pair of struts, the spring structure having a contact member, and ensuring that the contact member contacts the electrically conductive portion of the fuel filter to provide a grounding path through the fuel pump via the fuel filter.

18. The method of claim 17, wherein the electrically conductive spring structure includes a first spring member having coils; a second spring member having coils, and a central leg member joining the first and second springs members so as to be in spaced relation, and wherein the associating step includes receiving at least a portion of a strut in an associated coil.

19. The method of claim 18, wherein the ensuring step ensures that a portion of the central leg member contacts the electrically conductive portion of the fuel filter.

20. The method of claim 19, wherein a portion of the central member is disposed at an angle with respect to an axis of at least one of the spring members so as to force contact with the electrically conductive portion of the fuel filter.

* * * * *